United States Patent
Matsumoto et al.

(10) Patent No.: US 7,808,204 B2
(45) Date of Patent: Oct. 5, 2010

(54) CONTROLLER FOR FUEL CELL SYSTEM

(75) Inventors: Michihiko Matsumoto, Yokohama (JP);
Takeaki Obata, Yokohama (JP); Ikuhiro Taniguchi, Zushi (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 639 days.

(21) Appl. No.: 11/791,322

(22) PCT Filed: Oct. 19, 2005

(86) PCT No.: PCT/JP2005/019228
§ 371 (c)(1), (2), (4) Date: May 23, 2007

(87) PCT Pub. No.: WO2006/057124
PCT Pub. Date: Jun. 1, 2006

(65) Prior Publication Data
US 2008/0091629 A1    Apr. 17, 2008

(30) Foreign Application Priority Data
Nov. 26, 2004    (JP) ............... 2004-342515

(51) Int. Cl.
*H01M 10/44* (2006.01)
*H01M 2/00* (2006.01)
*B60L 1/00* (2006.01)
*G05D 17/00* (2006.01)

(52) U.S. Cl. ............. 320/101; 429/11; 429/47; 700/297; 307/10.1

(58) Field of Classification Search ........... 320/101; 429/32
See application file for complete search history.

(56) References Cited

U.S. PATENT DOCUMENTS

| | | | |
|---|---|---|---|
| 6,495,277 B1 * | 12/2002 | Edlund et al. | 429/22 |
| 6,841,275 B2 * | 1/2005 | Pearson | 429/9 |
| 6,904,337 B2 * | 6/2005 | Ueda et al. | 700/295 |
| 6,979,507 B2 * | 12/2005 | Edlund et al. | 429/23 |
| 7,087,327 B2 * | 8/2006 | Pearson | 429/12 |
| 7,129,674 B2 * | 10/2006 | Ichinose et al. | 320/101 |
| 2004/0214061 A1 * | 10/2004 | Sugiura et al. | 429/23 |

FOREIGN PATENT DOCUMENTS

| | | |
|---|---|---|
| JP | 11-195423 A | 7/1999 |
| JP | 2000-357526 A | 12/2000 |
| JP | 2001-023667 A | 1/2001 |
| JP | 2001-025106 A | 1/2001 |
| JP | 2004-207024 * | 7/2004 |

(Continued)

*Primary Examiner*—Edward Tso
*Assistant Examiner*—Yalkew Fantu
(74) *Attorney, Agent, or Firm*—Foley & Lardner LLP

(57) ABSTRACT

A fuel cell system capable of learning its current-voltage characteristics precisely in a short time even when the current-voltage characteristics of a fuel cell varies due to reduction of a catalyst of an oxidizing agent electrode during the stop of operation of the fuel cell system. A controller (13) learns current-voltage characteristics of a fuel cell stack (2), detects the amount of variation in voltage of current-voltage characteristics before a stop of power generation and those after restart of power generation, and corrects the learnt value of the current-voltage characteristics by the amount of variation in voltage.

18 Claims, 7 Drawing Sheets

FOREIGN PATENT DOCUMENTS

| | | |
|---|---|---|
| JP | 2004-207024 A | 7/2004 |
| JP | 2004-327055 A | 11/2004 |
| JP | 2004-335343 A | 11/2004 |
| JP | 2005-085504 A | 3/2005 |
| WO | WO 2004/059767 A2 | 7/2004 |

* cited by examiner

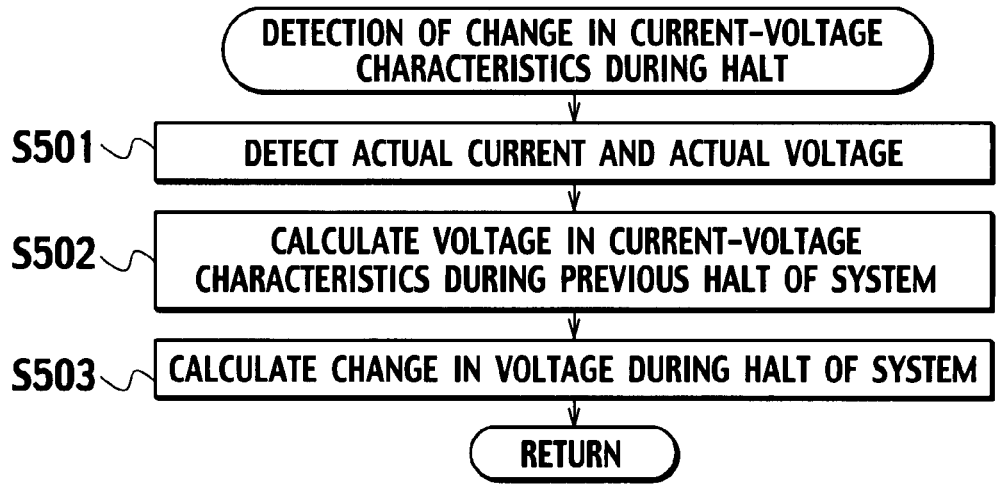
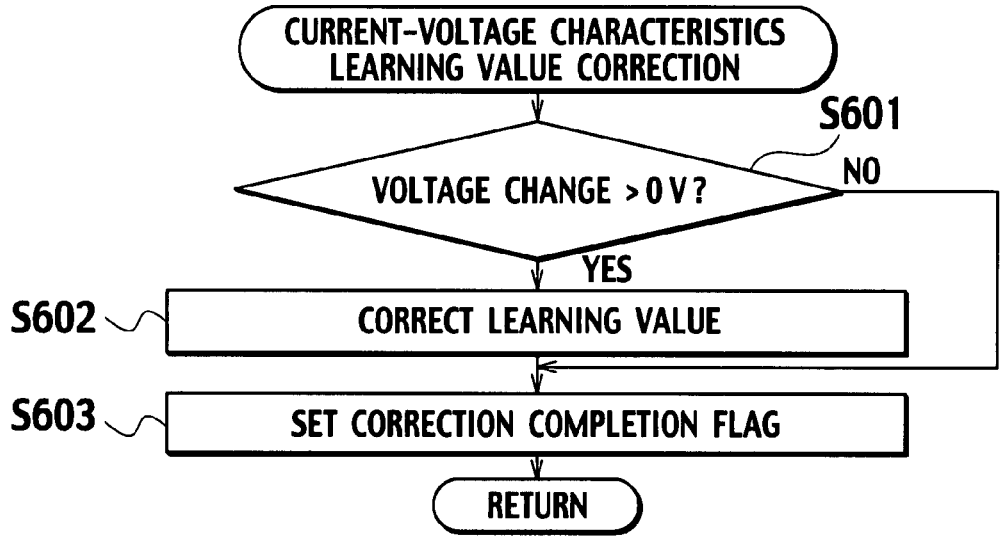
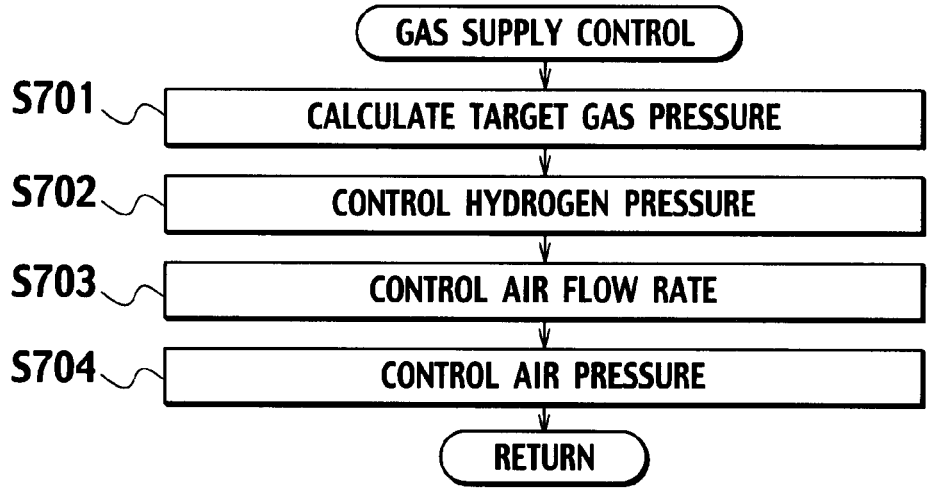

CONTROLLER FOR FUEL CELL SYSTEM

TECHNICAL FIELD

The invention relates to a controller for a fuel cell system and, more particularly, to a controller for a fuel cell system which learns current-voltage characteristics of a fuel cell.

BACKGROUND ART

A fuel cell is adapted to directly take out electric energy from electrodes disposed at both surfaces of an electrolyte by allowing fuel gas such as gaseous hydrogen and oxidant gas containing oxygen to electrochemically react with each other via the electrolyte. Particularly, a solid polymer fuel cell using a solid polymeric electrolyte comes to attention as an electric power source for an electric vehicle owing to a low operating temperature and easy handling. Specifically, a fuel cell vehicle is designed to mount thereon a hydrogen reservoir such as a high pressure hydrogen tank, a liquid hydrogen tank, or a hydrogen occlusion alloy tank, to send hydrogen supplied from the hydrogen reservoir and air containing oxygen to a fuel cell, in which the hydrogen and the oxygen react with each other, and then, to drive a motor connected to a drive wheel by electric energy taken out of the fuel cell. The fuel cell vehicle is an ultimately clean vehicle in which discharged substance is only water.

The fuel cell is a power generator capable of continuing power generation as long as fuel gas and oxidant gas are supplied. However, constituent elements such as an electrode catalyst and an electrolytic film are degraded in the course of usage, thereby deteriorating power generating performance.

Examples of a system for diagnosing the degradation of the fuel cell in accordance with the current-voltage characteristics of the fuel cell include a system disclosed in Patent Literature 1. This system derives an approximate expression of the relationship between a current and a voltage of the fuel cell, and then, diagnoses the degradation of the fuel cell using the approximate expression.

There has been known that an oxide film formed on a catalyst of an oxidant electrode in a fuel cell changes the current-voltage characteristics of a fuel cell, thereby decreasing a voltage. Since such a change in the characteristics (i.e., the decrease in voltage) is restored due to the reduction of the oxide film on the catalyst of the oxidant electrode during a halt of a fuel cell system, the current-voltage characteristics when the fuel cell system is brought to a halt is often remarkably different from those when the fuel cell system is restarted.

Patent Literature 1: Japanese Patent Application Laid-open No. 2000-357526 (page 5 and FIG. 2)

DISCLOSURE OF INVENTION

Problem to be Solved by the Invention

However, when the above-described learning system in the prior art is applied in the case where the voltage of the fuel cell is decreased due to the oxide film formed on the catalyst of the oxidant electrode, a problem is encountered that it takes a long period of time since the learning of the current-voltage characteristics converges at the time of the start of the fuel cell system, thereby deteriorating a learning accuracy.

Means for Solving the Problem

In order to solve the above-described problem, a controller for a fuel cell system according to the invention provided with a fuel cell, in which power generation is performed by an electrochemical reaction between fuel gas and oxidant gas, comprises: a current-voltage characteristics learning means which learns current-voltage characteristics of the fuel cell; a current-voltage characteristics change detecting means which detects a change in current-voltage characteristics at the time of restart of power generation by the fuel cell from the current-voltage characteristics before a halt of the power generation; and a current-voltage characteristics correcting means which corrects a learning value learned by the current-voltage characteristics learning means immediately before the power generation by the fuel cell is brought to a halt based on the change in current-voltage characteristics detected by the current-voltage characteristics change detecting means.

Effect of the Invention

According to the invention, the change in current-voltage characteristics is detected in the case where the change in current-voltage characteristics is caused by the reduction of the oxide film formed on the oxidant electrode in the fuel cell after the halt of the power generation by the fuel cell till the restart of the power generation, and a corrected current-voltage characteristics is used at the time of the restart of the power generation by the fuel cell.

As a consequence, even if the formation of the oxide film on the catalyst of the oxidant electrode in the fuel cell changes the current-voltage characteristics of the fuel cell, such an effect can be produced that the current-voltage characteristics can be accurately learned in a short period of time at the time of the restart of the fuel cell system.

BRIEF DESCRIPTION OF DRAWINGS

FIG. 5 is a flowchart illustrating the details of a current-voltage characteristics change detecting process during a halt in S404;

FIG. 6 is a flowchart illustrating the details of a current-voltage characteristics learning value correcting process in S405;

FIG. 7 is a flowchart illustrating the details of a gas supply controlling process in S204;

BEST MODE FOR CARRYING OUT THE INVENTION

Figure 1:
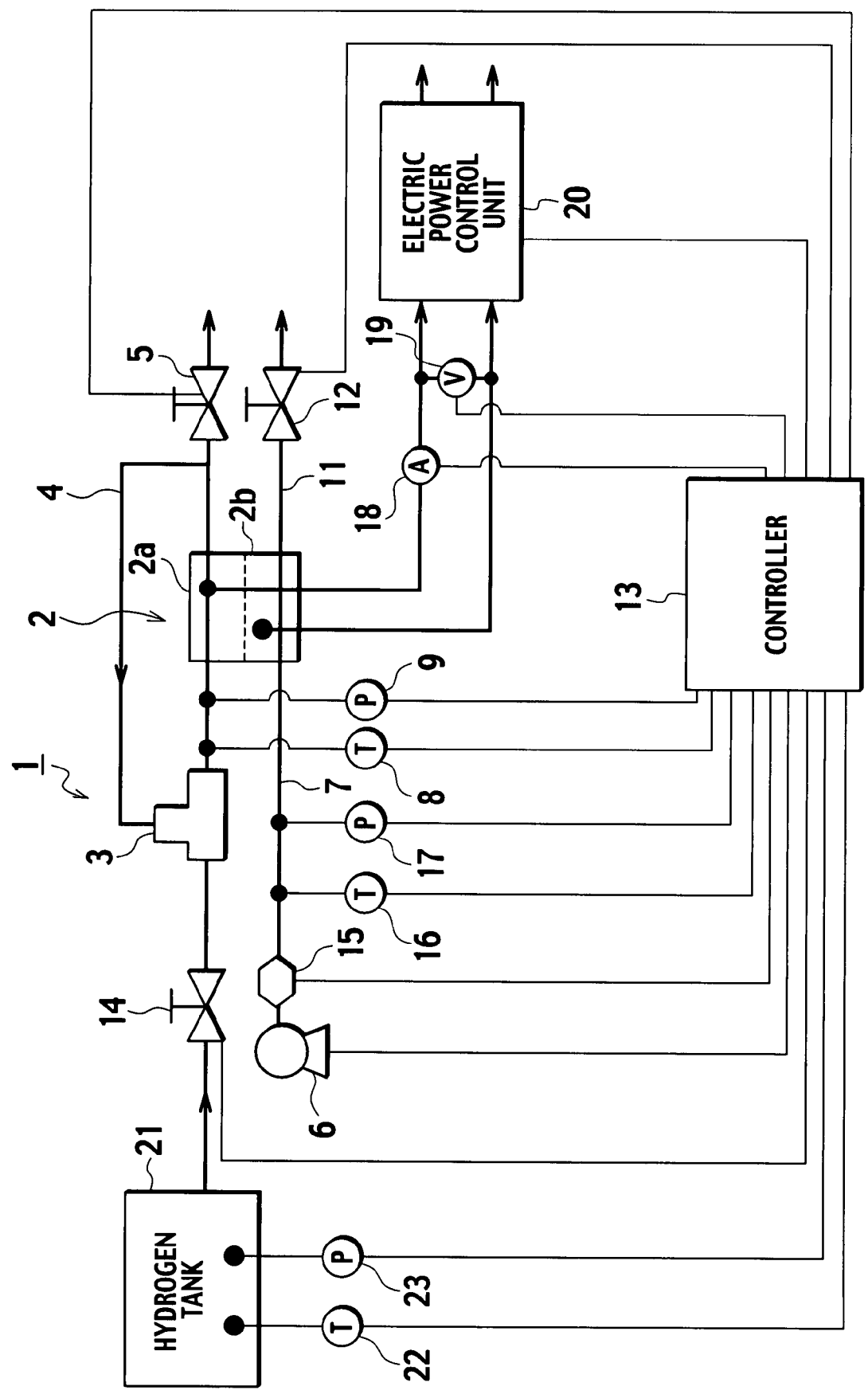
FIG. 1 is a diagram schematically illustrating the configuration of a fuel cell system provided with a controller for the fuel cell system according to the invention.

FIG. 1 is a diagram schematically illustrating the configuration of a fuel cell system, to which a controller for the fuel cell system according to the invention is applied.

In FIG. 1, a fuel cell system 1 includes: a fuel cell stack 2 functioning as a fuel cell which generates power by an electrochemical reaction between hydrogen as a fuel gas and air as an oxidant gas; an ejector 3 serving as a fluid pump for mixing fresh hydrogen and re-circulated hydrogen so as to supply the mixture to the fuel cell stack 2; a hydrogen circulating channel 4; a hydrogen purging valve 5; a compressor 6 for compressing the air to supply it to the fuel cell; an air supplying channel 7; a hydrogen inlet temperature sensor 8; a hydrogen inlet pressure sensor 9; an exhaust air channel 11; an air pressure control valve 12; a controller 13; a hydrogen pressure control valve 14; an air flow rate sensor 15; an air inlet temperature sensor 16; an air inlet pressure sensor 17; a current sensor 18; a voltage sensor 19; an electric power control unit 20; a hydrogen tank 21 for reserving the hydrogen serving as the fuel gas; a tank temperature sensor 22; and a tank pressure sensor 23.

The fuel cell stack 2 is provided with a fuel electrode 2a and an oxidant electrode 2b, and is exemplified by a solid polymer fuel cell using a solid polymeric electrolyte. The hydrogen pressure supplied from the hydrogen tank 21 is lowered down to an operating pressure by the hydrogen pressure control valve 14, and then, is supplied to the ejector 3. The ejector 3 mixes the fresh hydrogen supplied via the hydrogen pressure control valve 14 with the hydrogen passing through the hydrogen circulating channel 4, and then, supplies the mixed hydrogen to the fuel electrode 2a in the fuel cell stack 2. The temperature and pressure of the hydrogen at an inlet of the fuel electrode 2a are measured by the hydrogen inlet temperature sensor 8 and the hydrogen inlet pressure sensor 9, respectively. The hydrogen pressure control valve 14 is controlled in accordance with the pressure measured by the hydrogen inlet pressure sensor 9. Normally, the hydrogen purging valve 5 is closed, thereby recycling the hydrogen discharged from the fuel cell stack 2 in the hydrogen circulating channel 4. The temperature and pressure of the hydrogen tank 21 are measured by the tank temperature sensor 22 and the tank pressure sensor 23, respectively.

The oxidant air is supplied by the compressor 6. The air supplied by the compressor 6 is measured by the air flow rate sensor 15, and then, is supplied to the oxidant electrode 2b in the fuel cell stack 2 through the air supplying channel 7. The pressure and temperature of the air at an inlet of the oxidant electrode 2b are measured by the air inlet pressure sensor 17 and the air inlet temperature sensor 16, respectively, and the pressure is controlled by the air pressure control valve 12 disposed at an outlet of the oxidant electrode 2b.

An output current and an output voltage from the fuel cell stack 2 are measured by the current sensor 18 and the voltage sensor 19, respectively. Moreover, electric power taken out of the fuel cell stack 2 is controlled by the electric power control unit 20.

The electric power control unit 20 is exemplified by a step-up/step-down type DC/DC converter, and is interposed between the fuel cell stack 2 and an electric load, thereby controlling to convert a generation voltage at the fuel cell stack 2 into a predetermined load voltage. The DC/DC converter actuates different switching elements for a step-up conversion and a step-down conversion, and can output a desired voltage in accordance with a duty ratio of a control signal fed to the switching element. That is to say, the switching element is controlled in such a manner as to output a voltage equal to or higher than the input voltage during the step-up: in contrast, the switching element is controlled in such a manner as to output a voltage equal to or lower than the input voltage during the step-down.

In the present preferred embodiment, the pressures (i.e., the operating pressures) of the hydrogen and the air during the operation of the fuel cell stack 2 are variable. In other words, the operating pressure is increased when an output taken out of the fuel cell stack 2 is high: in contrast, the operating pressure is decreased when the output is low.

In the case where the fuel cell stack 2 is flooded with water (hereinafter referred to as "flooding") or the operating pressure in the fuel cell stack 2 is lowered, the hydrogen staying in the hydrogen circulating channel 4 and the fuel electrode 2a in the fuel cell stack 2 is discharged by opening the hydrogen purging valve 5.

A detection signal from each of the hydrogen inlet temperature sensor 8, the hydrogen inlet pressure sensor 9, the air flow rate sensor 15, the air inlet temperature sensor 16, the air inlet pressure sensor 17, the current sensor 18, the voltage sensor 19, the tank temperature sensor 22, and the tank pressure sensor 23 is connected to an input of the controller 13.

In addition, to an output of the controller 13 are connected respective actuators of the hydrogen purging valve 5, the compressor 6, the air pressure control valve 12, and the hydrogen pressure control valve 14, and the electric power control unit 20, which can be thus controlled by the controller 13.

The controller 13 controls each of the actuators and the electric power control unit 20 in order to perform the control according to the operating state of the fuel cell based on the detection signal received from each of the above-described sensors. Incidentally, the controller 13 is constituted of a microprocessor provided with a CPU, a program ROM, a working RAM, and an input/output interface in the present preferred embodiment, although particularly not limited.

Furthermore, the controller 13 controls the entire fuel cell system 1 by executing a control program stored in the program ROM.

Additionally, the controller 13 implements, in accordance with the control program, current-voltage characteristics learning means which learns the current-voltage characteristics of the fuel cell stack 2; current-voltage characteristics change detecting means which detects the change in current-voltage characteristics at the time of the restart of the power generation by the fuel cell stack 2 from the current-voltage characteristics before the halt of the power generation; and current-voltage characteristics correcting means which corrects the learning value learned by the current-voltage characteristics learning means immediately before the power generation by the fuel cell stack 2 is brought to a halt based on the change in current-voltage characteristics detected by the current-voltage characteristics change detecting means.

As a consequence, although the reduction of the oxide film formed on the catalyst of the oxidant electrode before the restart of the fuel cell changes the current-voltage characteristics of the fuel cell, the current-voltage characteristics can be accurately learned in a short period of time at the time of the restart of the fuel cell system.

Figure 2:
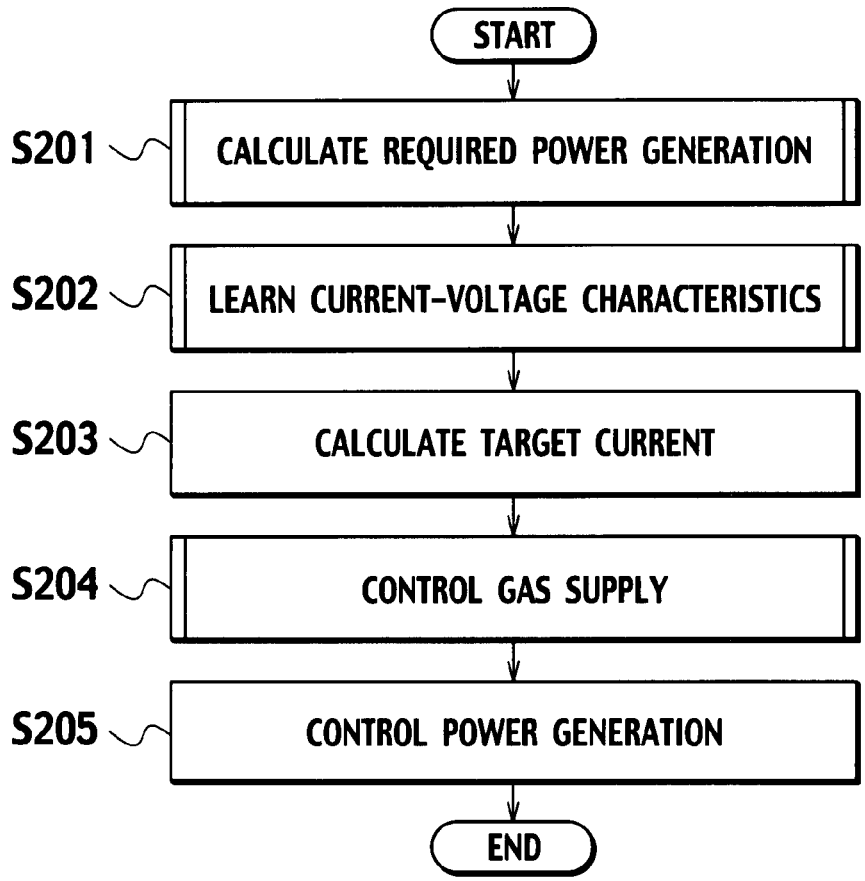
FIG. 2 is a flowchart schematically illustrating the controller for the fuel cell system in a preferred embodiment according to the invention.

FIG. 2 is a flowchart schematically illustrating the process of learning current-voltage characteristics of the fuel cell and the process of controlling power generation and gas supply in the fuel cell system in the controller for the fuel cell system according to the invention, wherein the process is performed in a predetermined cycle (for example, in a cycle of 10 msec).

First of all, in step (hereinafter a step is abbreviated as "S") 201, a required power generation in the fuel cell system is calculated, and then, the current-voltage characteristics of the fuel cell are learned in S202. In S203, a target current in the fuel cell is calculated, and thereafter, the hydrogen and the air are subjected to a gas supply control in S204. Finally, in S205, the power generation in the fuel cell is controlled.

Next, a description will be given in detail of the processing in each of S201 to S205 in FIG. 2.

Figure 3:
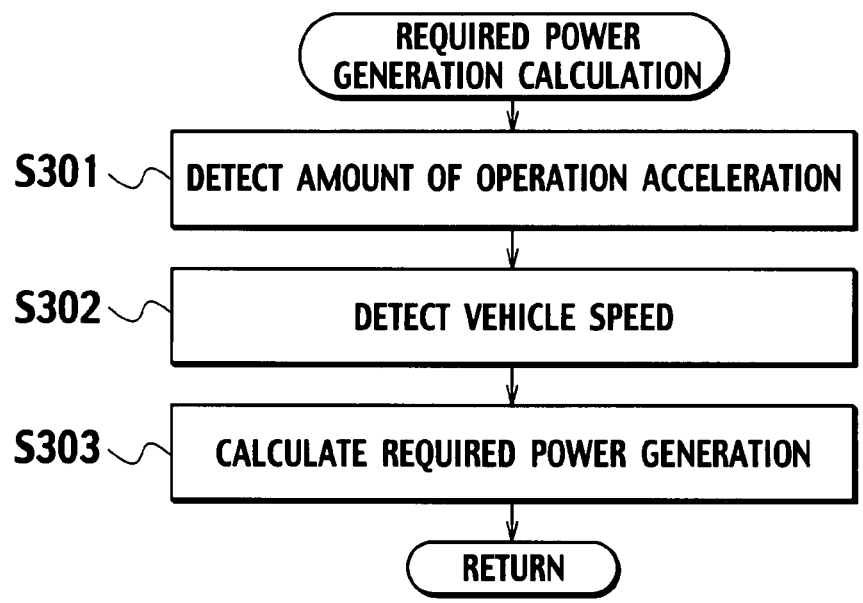
FIG. 3 is a flowchart illustrating the details of a required power generation calculating process in S201.

First, explanation will be made on the required power generation calculating process in S201. Here, the target power generation of the fuel cell is calculated based on the operating state of an electric load connected to the fuel cell system. For example, process when the fuel cell system is mounted on a hybrid type electric automobile will be explained with reference to a flowchart illustrated in FIG. 3.

First, in S301, an amount of acceleration operation by a driver is detected based on an output from an acceleration sensor provided in a vehicle, and then, a vehicle speed is detected based on an output from a vehicle speed sensor provided in the vehicle in S302.

Figure 8:
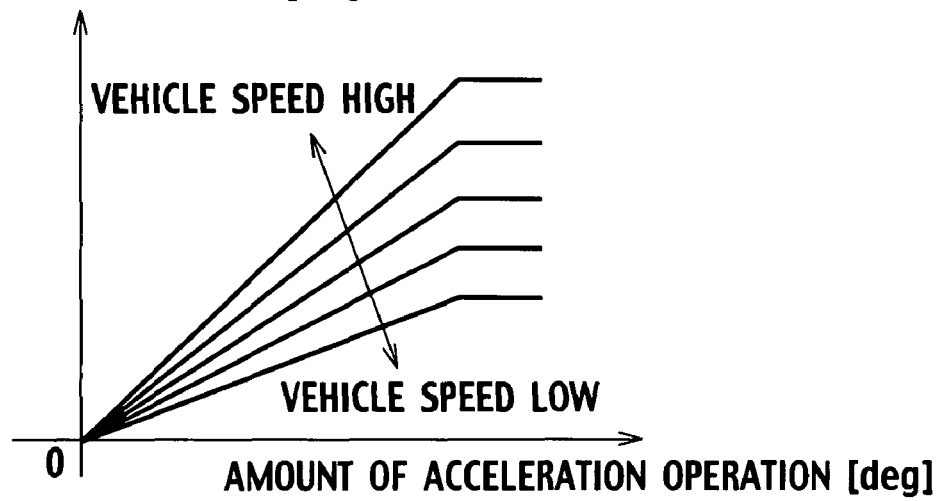
FIG. 8 is a graph illustrating an example of map data for use in calculating a required generation power in S201.

Thereafter, the required power generation is calculated in S303. Here, the required power generation is calculated based on, for example, the amount of acceleration operation and the vehicle speed by the use of map data illustrated in FIG. 8.

Figure 4:
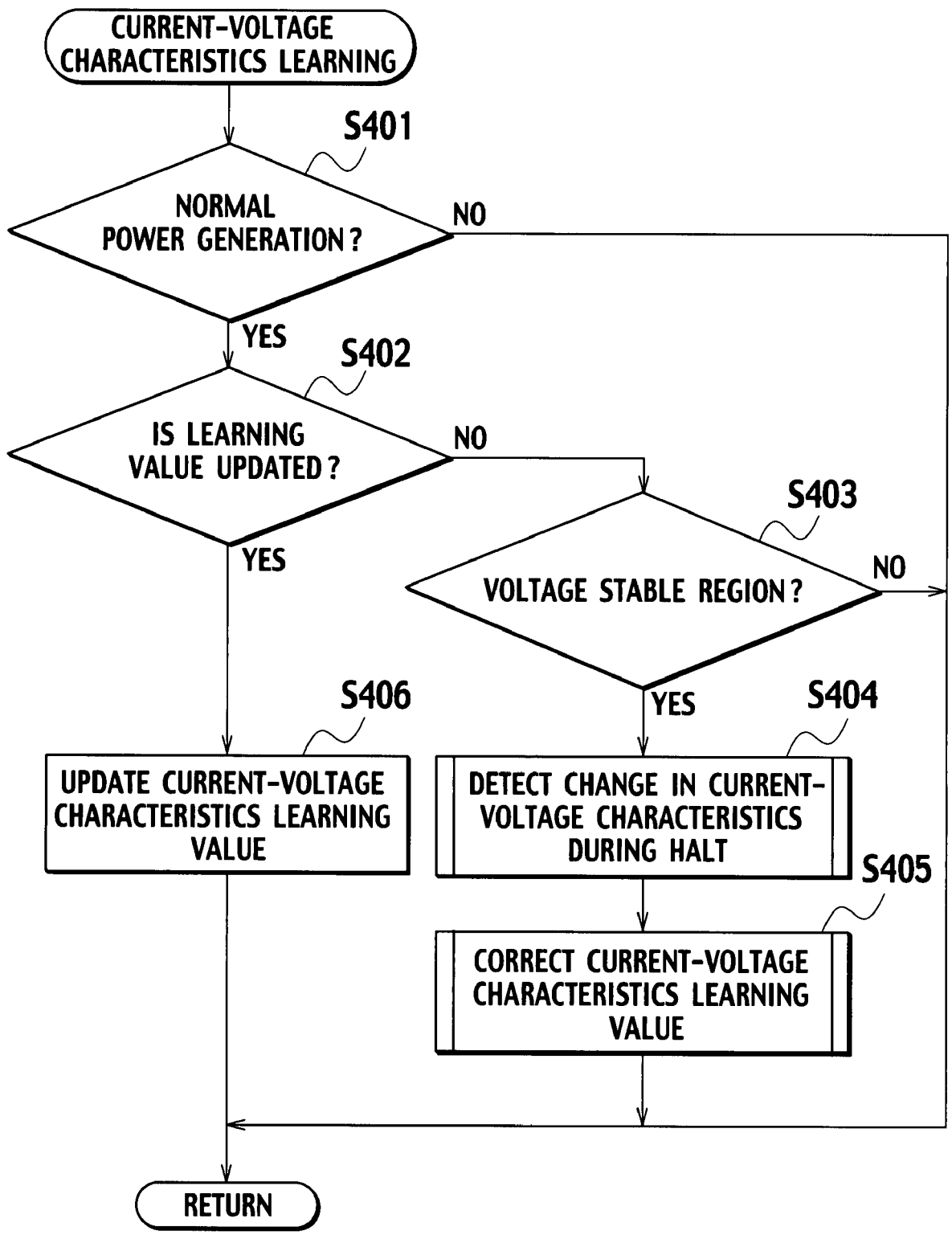
FIG. 4 is a flowchart illustrating the details of a current-voltage characteristics learning process in S202.

Subsequently, explanation will be made on the current-voltage characteristics learning process in S202 with reference to a flowchart illustrated in FIG. 4. Here, the current-voltage characteristics of the fuel cell are learned.

First, it is judged in S401 whether the power generation in the fuel cell is in a normal state or a transient state. The normal state judgment is made for deleting current-voltage data which cannot be stably measured during a load fluctuation in the fuel cell system.

Here, the normal state is judged when a change of the last value over the present value of actual currents detected by the current sensor 18 or actual voltages detected by the voltage sensor 19 illustrated in FIG. 1 becomes a predetermined value or lower. As another normal state judging method for a power generating state may be used in which it is judged as the normal state when a dispersion value of the actual current or the actual voltage measured for a predetermined period of time becomes the predetermined value or lower.

And then, a determination is made in S402 whether or not the learning value of the current-voltage characteristics is updated. It is decided as described later that the learning value is updated if a change in current-voltage characteristics is detected during the halt of the fuel cell system and the learning value of the current-voltage characteristics is corrected based on the detected change. Here, the determination is made based on the setting of a correction completion flag, described later. The control routine proceeds to S406 if an update of the learning value is required: in contrast, the control routine proceeds to S403 if an update of the learning value is not required.

Thereafter, real time changes in the current-voltage characteristics are learned in S406.

Here, the current current-voltage characteristics are expressed by an linear approximation of first-degree, where an input is a current I (an X-axis) and an output is a voltage V (a Y-axis). The linear function is formulated as the following equation (1):

$$V = A \cdot I + B \quad (1)$$

The inclination of the current-voltage characteristics is designated by A, and the Y intercept of the current-voltage characteristics is denoted by B as parameters to be learned.

A learning value updating method is implemented by updating the learned parameters A and B based on the measured actual voltage and an error from the learning value obtained by inputting the actual current into the equation (1) with a sequential parameter estimation algorithm by the use of a sequential least square method.

Otherwise, another current-voltage characteristics learning method may be used where a current is received as an input, table data is used in outputting a voltage as a learning result with respect to the input current, and the current-voltage characteristics are learned by updating the table data based on the relationship between the detected current and voltage. Alternatively, the current-voltage characteristics may be learned based on map data for use in outputting a voltage by using a current and an operating temperature as inputs.

And then, it is determined based on the actual current in S403 whether or not fuel cell load is in the region where the voltage can be stably detected.

Since an excessive voltage appears in a very low load region of the fuel cell, a change in voltage becomes much larger than a change in current, and therefore, the voltage cannot be stably detected. In the same manner, since a concentrative excessive voltage appears in a very high load region, the change in voltage becomes much larger than the change in current, and therefore, the voltage cannot be stably detected.

In view of this, the change in current-voltage characteristics during the halt of the fuel cell system need be detected in a region in which the voltage can be stably detected. Therefore, in order to determine whether the fuel cell is in neither the very low load region nor the very high load region, it is judged that the current current level is higher than a predetermined value on a low load side and is lower than a predetermined value on a high load side. In the voltage stable region in which the current at present is higher than the predetermined value on the low load side and is lower than the predetermined value on the high load side, the control routine proceeds to S404: in contrast, if the current current level is equal to or lower than the predetermined value on the low load side or equal to or higher than the predetermined value on the high load side, the current-voltage characteristics learning process comes to an end.

In the following, the method for detecting the change in current-voltage characteristics during the halt in S404 will be explained below with reference to a flowchart of FIG. 5. First, in S501, the ammeter 18 and the voltmeter 19 detect the actual current and the actual voltage of the fuel cell, respectively. And then, in S502, the voltage in the current-voltage characteristics when the fuel cell system was previously brought to a halt is calculated based on the actual current.

Here, the current-voltage characteristics learning value is not updated in S406 until the change in current-voltage characteristics during the halt of the fuel cell system is detected in S404 and the current-voltage characteristics learning value is corrected in S405. Therefore, the learning values of the inclination A of the current-voltage characteristics and the Y intercept B of the current-voltage characteristics stand at the value when the fuel cell system was previously brought to a halt. As a result, the voltage in the current-voltage characteristics when the fuel cell system was previously brought to a halt is calculated in accordance with the above-described equation (1) by using the inclination A of the current-voltage characteristics and the Y intercept B of the current-voltage characteristics, and the actual current detected in S501 as the inputs.

Thereafter, a change in voltage during the halt of the fuel cell system is calculated in S503. The change in voltage is calculated by subtracting, from the actual voltage at present detected in S501, the voltage calculated in S502 based on the actual current and the previous current-voltage characteristics when the fuel cell system was brought to a halt.

Subsequently, a method for correcting the current-voltage characteristics learning value in S405 will be explained with reference to a flowchart of FIG. 6.

First, it is judged in S601 whether or not the change in voltage in the current-voltage characteristics during the halt of the fuel cell system calculated in S503 exceeds 0 V. If the change exceeds 0 V, the control routine proceeds to S602: alternatively, if the change in voltage is equal to or lower than 0 V, the control routine jumps to S603.

And then, the current-voltage characteristics learning value is corrected in S602. Here, the current-voltage characteristics learning value is not updated in S406 until the change in current-voltage characteristics during the halt of the fuel cell system is detected in S404 and the current-voltage characteristics learning value is corrected in S405. Therefore, the learning values of the inclination A of the current-voltage characteristics and the Y intercept B of the current-voltage characteristics stand at the value when the fuel cell system was previously brought to a halt. As a result, the current-voltage characteristics learning value is corrected by adding the change in current-voltage characteristics during the halt detected in S404 to the Y intercept B of the current-voltage characteristics when the fuel cell system is brought to a halt.

If the current-voltage characteristics learning value is updated in S406 by using the method for updating the table data for the learning based on the relationship between the detected current and voltage, the learning value may be corrected by adding the change in voltage during the halt of the system detected in S404 to all of the table data.

Thereafter, the correction completion flag is set in S603, thereby completing the correction of the current-voltage characteristics learning value, so as to update the learning value in S402.

Next, a description will be given of a target current calculating processing in S203 in FIG. 2. Here, the target current for achieving the required power generation in S201 is calculated based on the current-voltage characteristics learned in S202. The target current (It) can be calculated by using an equation (3) expressing a root of an equation (2) obtained by substituting the voltage V in the approximation (1) of the current-voltage characteristics in S406 into a required power W(=It·V).

Required power $W = It \cdot V = A \cdot (It)^2 + B \cdot It$  (2)

Target current $It = (-B + \sqrt{(B^2 + 4AW)})/(2A)$  (3)

Here, reference character A designates the inclination of the current-voltage characteristics and reference character B denotes the Y intercept of the current-voltage characteristics.

Next, a description will be given of the gas supply process in S204. Here, the hydrogen and the air are subjected to a gas supply control. An example of the process will be explained in reference to a flowchart of FIG. 7.

Figure 9:
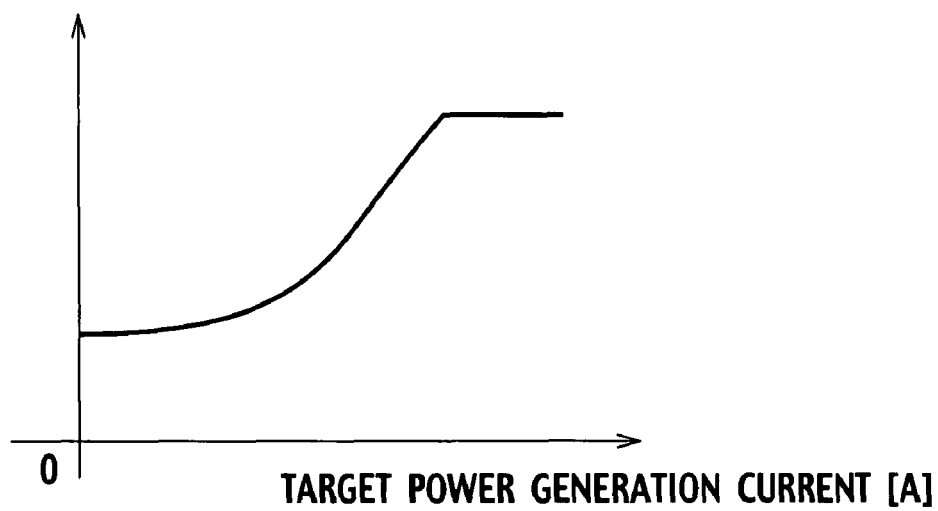
FIG. 9 is a graph illustrating an example of table data for use in calculating a target gas pressure in S701.

A target gas pressure is calculated in S701. The target gas pressure is determined by the use of table data illustrated in FIG. 9 based on a target power generation current. The table data is set in consideration of a power generation efficiency in the fuel cell.

And then, the pressure of the gaseous hydrogen is controlled in S702. Here, the pressure of the hydrogen is controlled by actuating the hydrogen pressure control valve 14 based on the target gas pressure. An instructed opening degree of the hydrogen pressure control valve 14 is determined by a feedback (F/B) control based on a deviation of the hydrogen pressure at the fuel cell detected by the hydrogen inlet pressure sensor 9 from the target gas pressure, so that the hydrogen pressure control valve 14 is actuated.

The F/B control may be achieved in a generally well-known method such as a PI control or a model code control. Moreover, the controller 13 instructs a drive circuit incorporated in the hydrogen pressure control valve 14 on the opening degree of the hydrogen pressure control valve 14, thereby driving the hydrogen pressure control valve 14 in accordance with the instructed opening degree.

Figure 10:
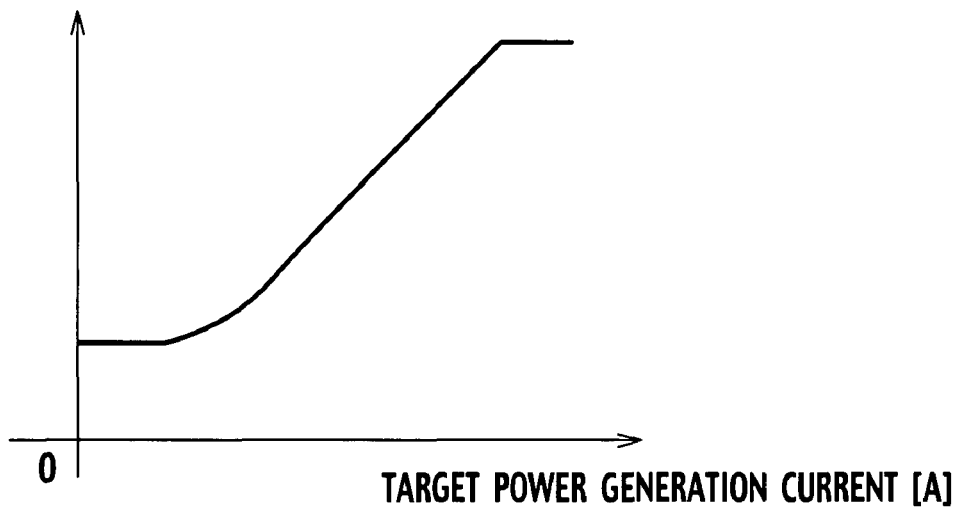
FIG. 10 is a graph illustrating an example of table data for use in calculating a target air flow rate in S703.

Thereafter, the flow rate of the gaseous air is controlled in S703. Here, a target air flow rate is calculated based on the target power generation current with reference to table data illustrated in FIG. 10. The table data is set to become an air utilizing rate in such a manner as not to cause any local shortage of air supply inside of the fuel cell.

Figure 11:
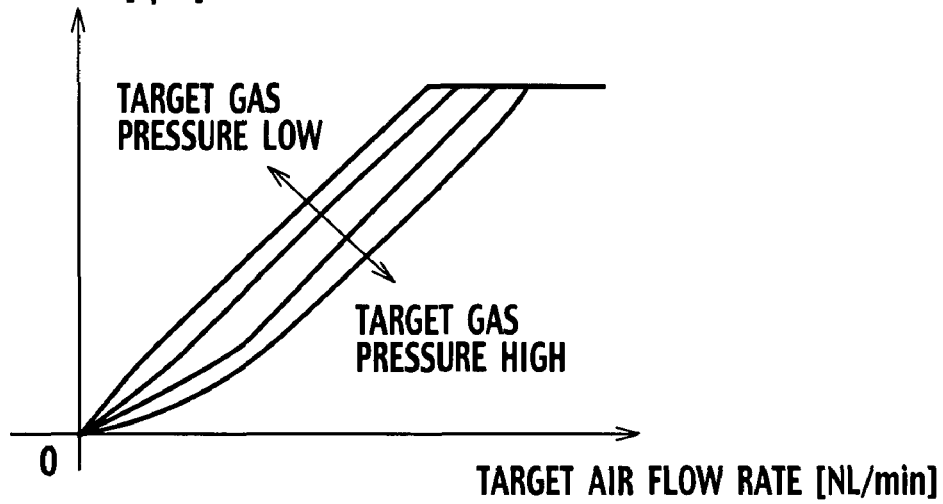
FIG. 11 is a graph illustrating an example of map data for use in calculating an instructed compressor rotation speed in S703.

Next, a rotational speed of the compressor 6 is calculated based on the target gas pressure and the target air flow rate with reference to map data illustrated in FIG. 11. The map data is set on the basis of the characteristics of the air flow rate with respect to the rotational speed of the compressor and a pressure ratio. Moreover, the controller 13 instructs a drive circuit in the compressor 6 on the rotational speed of the compressor calculated herein, thereby driving the compressor 6 in accordance with the instructed rotational speed.

Subsequently, the pressure of the gaseous air is controlled in S704. Here, the air pressure is controlled by actuating the air pressure control valve 12 based on the target air pressure. An opening degree of the air pressure control valve is determined by the F/B control based on a deviation of the air pressure at the fuel cell detected by the air inlet pressure sensor 17 from the target air pressure, thereby actuating the air pressure control valve.

The F/B control may be achieved in the generally well-known method such as the PI control or the model code control. Moreover, the controller 13 instructs the drive circuit in the air pressure control valve 12 on the opening degree of the air pressure control valve determined herein, thereby driving the air pressure control valve 12 in accordance with the instructed opening degree.

Next, a description will be given of the power generation control process in S205 in FIG. 2. Here, the power generation of the fuel cell is controlled based on the required power generation. The controller 13 instructs the electric power control unit 20 on the required power generation, thereby controlling the power generation in the fuel cell in accordance with the instructed power generation.

Figure 12:
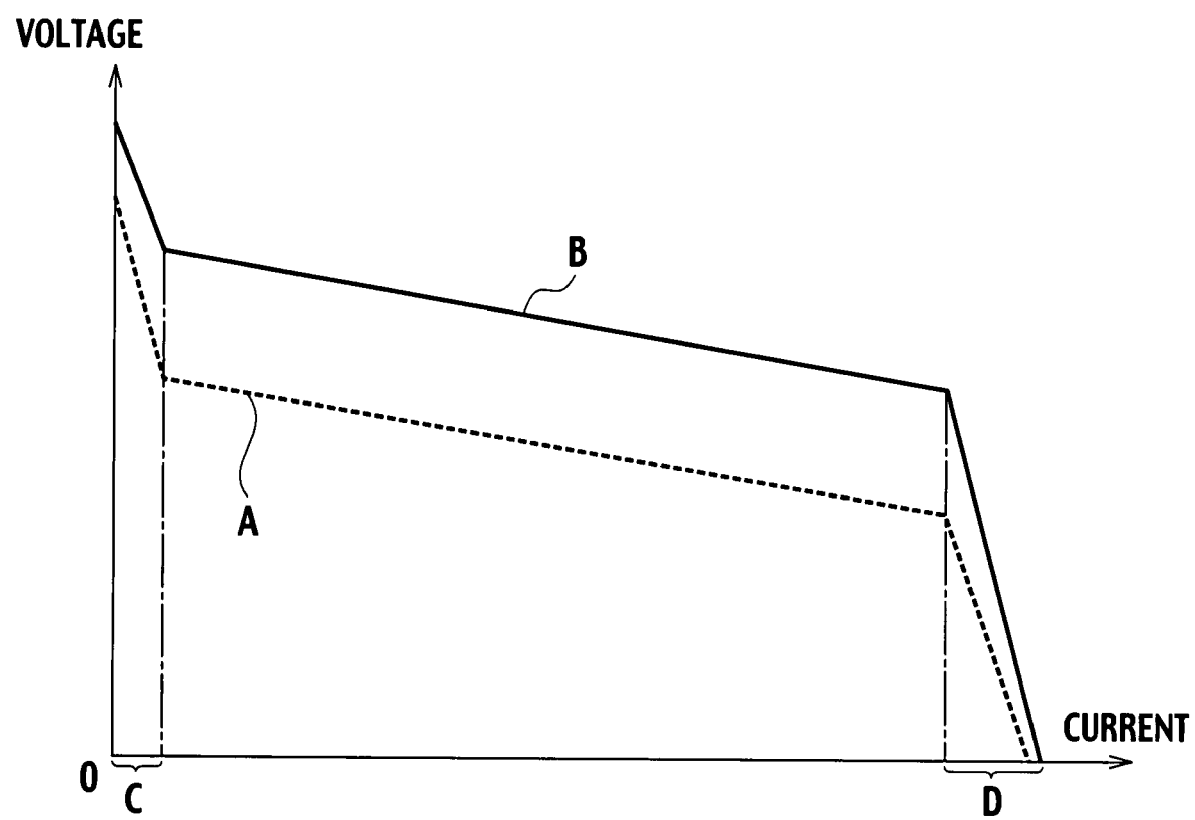
FIG. 12 is a graph illustrating a function according to the invention.

Subsequently, explanation will be made on the function of the invention with reference to FIG. 12.

One of the types of degraded of the current-voltage characteristics in the fuel cell system is a change in current-voltage characteristics caused by the oxide film formed on the catalyst of a cathode. Since the change in characteristics is caused by the increase inactive over-voltage, a certain level of voltage decrease occurs irrespective of the current. The decrease in voltage is restored by reducing the oxide film. As a consequence, the hydrogen in an anode crosses over the cathode during the halt of the power generation in the fuel cell, thereby inducing a possibility that current-voltage characteristics A at the time of the halt of the power generation and current-voltage characteristics B at the time of the restart of the power generation are markedly different from each other due to reduction of the oxide film, as illustrated in FIG. 12.

When the conventional current-voltage characteristics are applied to such a phenomenon, it may possibly take a long period of time to learn the large change in current-voltage characteristics at the time of the start of the power generation, thereby giving rise to a possibility that a large learning error occurs until the learning value is converged. The electric load on the fuel cell system depends upon the electric power. In the meantime, the supply of the gas required for the power generation is controlled according to the current. Therefore, the accurate relationship between the electric power and the current need be established. As described above, in the case where the large learning error occurs in the learning value of the current-voltage characteristics, the gas supply may be unfavorably excessive or insufficient.

In contrast, when the invention is applied to the above-described phenomenon, the change in current-voltage characteristics during the halt of the fuel cell system is detected, and then, the current-voltage characteristics are corrected as the predetermined change in voltage based on the detected change irrespective of the current. Consequently, it is possible to accurately correct the recovery of the current-voltage characteristics due to the reduction of the oxide film on the cathode side.

In the fuel cell, since an excessive over-voltage appears in a super low load region C (i.e., a region in which the excessive over-voltage appears), the change in voltage is much larger than that in current, thereby making it impossible to stably detect the voltage. In the same manner, since the concentrative over-voltage appears in a super high load region D (i.e., a region in which the concentrative over-voltage appears), the change in voltage is larger than that in current, thereby making it impossible to stably detect the voltage. Consequently, detecting changes in current-voltage characteristics is not performed during the halt of the fuel cell system in the super low load region C and the super high load region D, so that the voltage to be used for the learning value is stably detected, so as to enhance a learning accuracy.

The normal learning of the current-voltage characteristics is designed to be started upon completion of the correction of the change in current-voltage characteristics during the halt of the fuel cell system. As a consequence, it is possible to accurately correct the recovery of the current-voltage characteristics due to the reduction of the oxide film on the cathode side.

Additionally, if the change in current-voltage characteristics during the halt of the fuel cell system is inclined to the decrease in voltage, it is determined that the voltage is decreased differently from the case of the decrease in voltage due to the reduction of the oxide film on the cathode side. In this case, the learning accuracy is enhanced by starting the normal learning of the current-voltage characteristics.

INDUSTRIAL APPLICABILITY

According to the invention, the change in current-voltage characteristics is detected in the case where the change in current-voltage characteristics is caused by the phenomenon of the reduction of the oxide film formed on the oxidant electrode in the fuel cell after the halt of the power generation by the fuel cell before the restart of the power generation, thus correcting the current-voltage characteristics at the time of the start of the power generation by the fuel cell.

The invention claimed is:

1. A controller for a fuel cell system provided with a fuel cell, in which power generation is performed by an electrochemical reaction between fuel gas and oxidant gas, the controller for the fuel cell system comprising:
   current-voltage characteristics learning means which learns current-voltage characteristics of the fuel cell;
   current-voltage characteristics change detecting means which detects a change in current-voltage characteristics at a time of restart of power generation by the fuel cell over the current-voltage characteristics before a halt of the power generation; and
   current-voltage characteristics correcting means which corrects a learning value learned by the current-voltage characteristics learning means immediately before the power generation by the fuel cell is brought to a halt based on the change in current-voltage characteristics detected by the current-voltage characteristics change detecting means.

2. A controller for a fuel cell system according to claim 1, wherein the current-voltage characteristics change detecting means detects a change in the current-voltage characteristics before the power generation by the fuel cell is brought to a halt over the current-voltage characteristics when the power generation is restarted as a predetermined change in voltage irrespective of a current.

3. A controller for a fuel cell system according to claim 2, wherein the current-voltage characteristics change detecting means detects a change of the current-voltage characteristics before the power generation by the fuel cell is brought to a halt over the current-voltage characteristics when the power generation is restarted at an arbitrary current.

4. A controller for a fuel cell system according to claim 2, wherein the current-voltage characteristics change detecting means calculates a change in voltage before the power generation by the fuel cell is brought to a halt until the power generation is restarted based on a voltage at an arbitrary current of the fuel cell and a voltage corresponding to the current in the current-voltage characteristics learned by the current-voltage characteristics learning means immediately before the power generation by the fuel cell is brought to a halt.

5. A controller for a fuel cell system according to claim 1, wherein the current-voltage characteristics change detecting means includes a means which prevents any detection of a change in current-voltage characteristics of the fuel cell after the power generation by the fuel cell is brought to a halt until the power generation of the fuel cell is restarted in a case where the current of the fuel cell is smaller than a first predetermined value or is greater than a second predetermined value which is greater than the first predetermined value.

6. A controller for a fuel cell system according to claim 1, wherein the current-voltage characteristics change detecting means estimates a change in current-voltage characteristics of the fuel cell after the power generation by the fuel cell is brought to a halt until the power generation of the fuel cell is restarted.

7. A controller for a fuel cell system according to claim 1, wherein the current-voltage characteristics correcting means increases, by a predetermined voltage irrespective of the current, the learning value learned by the current-voltage characteristics learning means when the power generation by the fuel cell is brought to a halt.

8. A controller for a fuel cell system according to claim 1, wherein the current-voltage characteristics correcting means includes a means which prevents any correction of the current-voltage characteristics where the change in current-voltage characteristics detected by the current-voltage characteristics change detecting means is inclined to decrease the voltage.

9. A controller for a fuel cell system according to claim 1, wherein the current-voltage characteristics learning means includes a means which prohibits the learning means from learning any new current-voltage characteristics until completion of correction of the current-voltage characteristics by the current-voltage characteristics correcting means.

10. A method for controlling a fuel cell system provided with a fuel cell, the method comprising:
performing a power generation by an electrochemical reaction between fuel gas and oxidant gas;
detecting a change in current-voltage characteristics at a time of restart of the power generation by the fuel cell over current-voltage characteristics before a halt of the power generation;
learning a current-voltage characteristics of the fuel cell immediately before the power generation by the fuel cell is brought to a halt, resulting in a learning value; and
correcting the learning value based on the change in the current-voltage characteristics.

11. A method according to claim 10, further comprising detecting a change in the current-voltage characteristics before the power generation by the fuel cell is brought to a halt over the current-voltage characteristics when the power generation is restarted as a predetermined change in voltage irrespective of a current.

12. A method according to claim 11, further comprising detecting a change of the current-voltage characteristics before the power generation by the fuel cell is brought to a halt over the current-voltage characteristics when the power generation is restarted at an arbitrary current.

13. A method according to claim 11, further comprising calculating a change in voltage before the power generation by the fuel cell is brought to a halt until the power generation is restarted based on a voltage at an arbitrary current of the fuel cell and a voltage corresponding to the current in the current-voltage characteristics learned immediately before the power generation by the fuel cell is brought to a halt.

14. A method according to claim 10, further comprising preventing any detection of a change in current-voltage characteristics of the fuel cell after the power generation by the fuel cell is brought to a halt until the power generation of the fuel cell is restarted in a case where the current of the fuel cell is smaller than a first predetermined value or is greater than a second predetermined value which is greater than the first predetermined value.

15. A method according to claim 10, further comprising estimating a change in current-voltage characteristics of the fuel cell after the power generation by the fuel cell is brought to a halt until the power generation of the fuel cell is restarted.

16. A method according to claim 10, further comprising increasing, by a predetermined voltage irrespective of the current, the learning value when the power generation by the fuel cell is brought to a halt.

17. A method according to claim 10, further comprising preventing any correction of the current-voltage characteristics where the change in current-voltage characteristics detected is inclined to decrease the voltage.

18. A method according to claim 10, further comprising preventing learning any new current-voltage characteristics until completion of correction of the current-voltage characteristics.

* * * * *